(12) United States Patent
She et al.

(10) Patent No.: US 10,198,229 B2
(45) Date of Patent: Feb. 5, 2019

(54) METHOD OF SHARING CLOUD PRINTER IN A CLOUD PRINT SYSTEM, CLOUD SERVER, AND CLOUD PRINT SYSTEM

(71) Applicant: Zhuhai Pantum Electronics Co., Ltd., Zhuhai (CN)

(72) Inventors: Shaohua She, Zhuhai (CN); Jibing Peng, Zhuhai (CN)

(73) Assignee: ZHUHAI PANTUM ELECTRONICS CO., LTD., Zhuhai (CN)

(*) Notice: Subject to any disclaimer, the term of this patent is extended or adjusted under 35 U.S.C. 154(b) by 0 days.

(21) Appl. No.: 15/730,964

(22) Filed: Oct. 12, 2017

(65) Prior Publication Data
US 2018/0032297 A1    Feb. 1, 2018

Related U.S. Application Data

(63) Continuation-in-part of application No. PCT/CN2016/076763, filed on Mar. 18, 2016.

(30) Foreign Application Priority Data

Apr. 17, 2015  (CN) .......................... 2015 1 0184771

(51) Int. Cl.
G06F 3/12          (2006.01)
H04L 29/08         (2006.01)

(52) U.S. Cl.
CPC .......... *G06F 3/1288* (2013.01); *G06F 3/1204* (2013.01); *G06F 3/1238* (2013.01);
(Continued)

(58) Field of Classification Search
None
See application file for complete search history.

(56) References Cited

U.S. PATENT DOCUMENTS 8,854,669  B1   10/2014   Jazayeri et al.
2011/0090529 A1  4/2011   Hertling
(Continued)

FOREIGN PATENT DOCUMENTS

CN   102811183 A   12/2012
CN   103412730 A   11/2013
(Continued)

OTHER PUBLICATIONS

The World Intellectual Property Organization (WIPO) International Search Report for PCT/CN2016/076763 dated Jun. 16, 2016 6 Pages.
(Continued)

*Primary Examiner* — Frantz Bataille
(74) *Attorney, Agent, or Firm* — Anova Law Group, PLLC

(57) ABSTRACT

A method for sharing a cloud printer in a cloud print system, a cloud server, and a cloud print system are provided. The method includes sharing cloud-printer-information from a first client terminal with a second client terminal, where the first client terminal has a first cloud print account linked to the cloud printer; receiving the cloud-printer-information on the second client terminal; sending, from the second client terminal, to the cloud server a request to link the cloud printer, through a second cloud print account; and linking the second client terminal to the cloud printer by the cloud server, after receiving the request to link the cloud printer from the second client terminal. The second cloud print account is one of the first cloud print account and a cloud print account that is different from the first cloud print account.

20 Claims, 7 Drawing Sheets

(52) U.S. Cl.
CPC .......... *G06F 3/1287* (2013.01); *G06F 3/1292* (2013.01); *H04L 67/02* (2013.01); *G06F 3/1279* (2013.01)

(56) References Cited

U.S. PATENT DOCUMENTS

| | | | |
|---|---|---|---|
| 2013/0222839 A1* | 8/2013 | Armstrong | G06F 3/1203 358/1.14 |
| 2014/0089426 A1* | 3/2014 | Kwon | G06Q 10/107 709/206 |

FOREIGN PATENT DOCUMENTS

| | | | |
|---|---|---|---|
| CN | 104834489 A | 8/2015 | |
| JP | 2013522774 A | 6/2013 | |
| JP | 2013149103 A | 8/2013 | |
| JP | 2014532209 A | 12/2014 | |

OTHER PUBLICATIONS

The European Patent Office (EPO) The Extended European Search Report for 16779498.1 dated Sep. 3, 2018 7 Pages.

\* cited by examiner

# METHOD OF SHARING CLOUD PRINTER IN A CLOUD PRINT SYSTEM, CLOUD SERVER, AND CLOUD PRINT SYSTEM

CROSS-REFERENCES TO RELATED APPLICATIONS

This application is a continuation-in-part application of PCT Patent Application No. PCT/CN2016/076763, filed on Mar. 18, 2016, which claims priority of Chinese Patent Application No. 201510184771.5, filed on Apr. 17, 2015, the entire contents of both of which are hereby incorporated by reference.

FIELD OF THE INVENTION

The present disclosure generally relates to the field of cloud print technology and, more particularly, relates to a method of sharing a cloud printer in a cloud print system, a cloud server and a cloud print system.

BACKGROUND

In the existing cloud print technology, when a user uses a mobile terminal and a cloud printer for cloud printing, the user runs a cloud print program, i.e., a cloud print application program, on the mobile terminal, logs into a corresponding cloud print account, and further needs to scan a one-dimensional code or a two-dimensional code through the mobile terminal such as a mobile phone, or manually input the cloud printer's device code, an access key and other related data, in order to achieve registration and binding between the cloud printer and the cloud print program/the cloud print account on the user's mobile terminal.

However, the registration and binding process have certain drawbacks. For example, if the use uses a mobile terminal such as a mobile phone for scanning the one-dimensional code or the two-dimensional code, the user's mobile terminal and the cloud printer need to be located in same or similar locations and need to maintain a close distance. If the user uses the manual input method, it is inconvenient for the user to enter a long printer device code and a long access key, and further the method of manually inputting and saving the access key has certain security risks.

The disclosed method of sharing a cloud printer in a cloud print system, cloud server and cloud print system are directed to solve one or more problems set forth above and other problems.

BRIEF SUMMARY OF THE DISCLOSURE

One aspect of the present disclosure provides a method for sharing a cloud printer in a cloud print system. The method includes sharing cloud-printer-information from a first client terminal with a second client terminal, where the first client terminal has a first cloud print account registered to a cloud server in the cloud print system, and the first cloud print account is linked to the cloud printer; receiving the cloud-printer-information on the second client terminal; sending, from the second client terminal, to the cloud server a request to link the cloud printer, through a second cloud print account; and linking the second client terminal to the cloud printer by the cloud server, after receiving the request to link the cloud printer from the second client terminal. The second cloud print account is one of the first cloud print account and a cloud print account that is different from the first cloud print account.

Another aspect of the present disclosure provides a cloud server for a cloud print system. The cloud server includes a cloud printer registration interface; a cloud print account registration interface; a linking module configured to link a cloud print account registered through the cloud print account registration interface to a cloud printer registered through the cloud printer registration interface; a communication module configured to communicate with a client terminal, where the client terminal uses the cloud print account; and a verification module configured to verify validity of a request. When the communication module receives a request of sharing a cloud printer linked to a first cloud print account, from a first client terminal through a first cloud print account, the verification module verifies the request. If the request is valid, the communication module pushes cloud-printer-sharing-information to a second client terminal through a second cloud print account. The second cloud print account is one of the first cloud print account and a cloud print account that is different from the first cloud print account. The linking module links the second cloud print account to the cloud printer, when the communication module receives a request to link the cloud printer from the second client terminal through the second cloud print account.

Another aspect of the present disclosure provides a cloud print system. The cloud print system includes a cloud server having a first cloud print account registered thereto; a cloud printer registered to the cloud server and linked to the first cloud print account; a first client terminal communicating with the cloud server through the first cloud print account; and a second client terminal communicating with the cloud server through a second cloud print account. The second cloud print account is one of the first cloud print account and a cloud print account that is different from the first cloud print account. The first client terminal shares cloud-printer-information with the second client terminal, and the second client terminal receives the cloud-printer-information. The second client terminal, through the second cloud print account, sends to the cloud server a request to link the cloud printer. The cloud server receives, the request to link the cloud printer, from the second client terminal, and links the second cloud print account to the cloud printer through a linking module of the cloud server.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present disclosure. Further, in the present disclosure, the disclosed embodiments and the features of the disclosed embodiments may be combined under conditions without conflicts.

The cloud print technology can use the Internet as a basis to integrate printing equipment resources, to build a shared print platform, and to provide the whole society with print services of standardized qualities.

In general, a user may need to scan a one-dimensional code or a two-dimensional code through the mobile terminal, or manually input the cloud printer's device code, an access key and other related data, in order to achieve registration and binding between a cloud printer and a cloud print program/a cloud print account. The registered and bound cloud printer can be displayed in a printer list of the cloud print program of the user's mobile terminal. Accordingly, the user can complete a print job through the mobile terminal and the cloud printer. The registration and binding process may have certain drawbacks as described in the background section.

Figure 1:
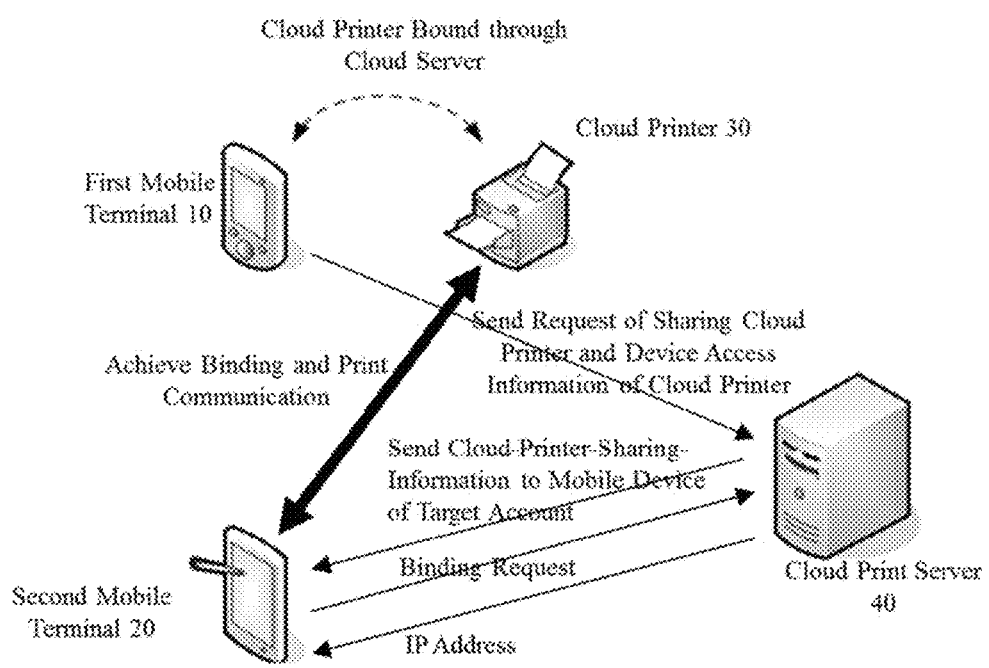
FIG. 1 illustrates a schematic view of an exemplary cloud print system consistent with disclosed embodiments.

A cloud print system may include, for example, a cloud server (e.g. a cloud print server) that comes with a cloud storage, at least one cloud printer registered to the cloud server, and one or more client terminals connected to the cloud server. The client terminal can include, for example, a mobile terminal. The mobile terminal can include, for example, a mobile phone. FIG. 1 illustrates a schematic view of an exemplary cloud print system consistent with disclosed embodiments.

As shown in FIG. 1, the exemplary cloud print system includes a first mobile terminal 10, a second mobile terminal 20, a cloud printer 30, and a cloud server 40, i.e., a cloud print server 40. The cloud printer 30 may generally be provided with, for example, a static or dynamic two-dimensional code, or a function module same as or similar to near-field-communication (NFC) module, such that device information of the cloud printer can be provided to one or more mobile terminals for identification purposes. Accordingly, at least the first mobile terminal 10 may be configured to include a camera and an NFC module, for reading the two-dimensional code of the cloud printer 30 or printer device information contained in the NFC module of the cloud printer 30.

In the cloud print system, the cloud server 40 may be configured to perform, for example, the following functions. A register interface is provided for at least one cloud printer, such that the at least one cloud printer can be registered to the cloud print system. An interface for registering a cloud print account is provided to the user, such that the user can access the cloud print system after completing a registration process through a client terminal. Registration information of the registered at least one cloud printer and the cloud print account is saved in the cloud storage for processing. A linking service, i.e., a binding service, is realized, between the at least one cloud printer and the cloud print account. Cloud print service-related data, commands and statuses are processed. Information communication and processing between any devices (including cloud printers) in the cloud print system is realized.

Figure 2:
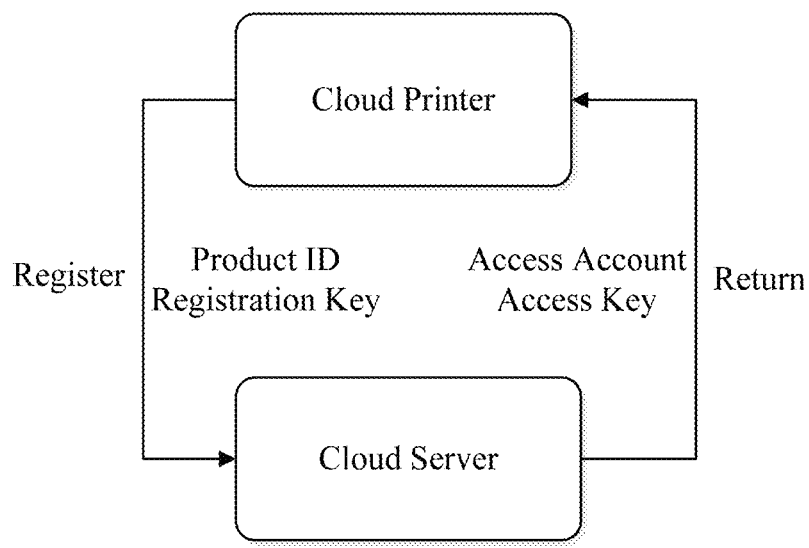
FIG. 2 illustrates a schematic view of an exemplary process of registering an exemplary cloud printer to an exemplary cloud server consistent with disclosed embodiments.

The cloud printer 30 may be configured to provide cloud print services to one or more cloud print accounts linked (bounded) to the cloud printer 30 in the cloud print system, after the cloud printer 30 is registered to the cloud server 40 through the register interface provided by the cloud server 40. FIG. 2 illustrates a schematic view of an exemplary process of registering an exemplary cloud printer to an exemplary cloud print server consistent with disclosed embodiments.

In various embodiments, as shown in FIG. 2, the cloud printer uses a registration interface provided by the cloud server, and registers with a corresponding product identification (ID) and a previously applied registration key via an Internet protocol, e.g., the hyper-text-transfer-protocol-secure (HTTPS) protocol. After the registration is successful, the cloud server assigns a cloud printer access account and a string of access key to the cloud printer. The cloud printer can then log into the cloud server using the access account and the access key. After the cloud printer logs into the cloud server, the cloud server places the cloud printer in an online list to serve client terminals in the cloud print system. In some embodiments, such as the embodiments shown in FIG. 1, the client terminals can include, for example, mobile terminals.

Figure 3:
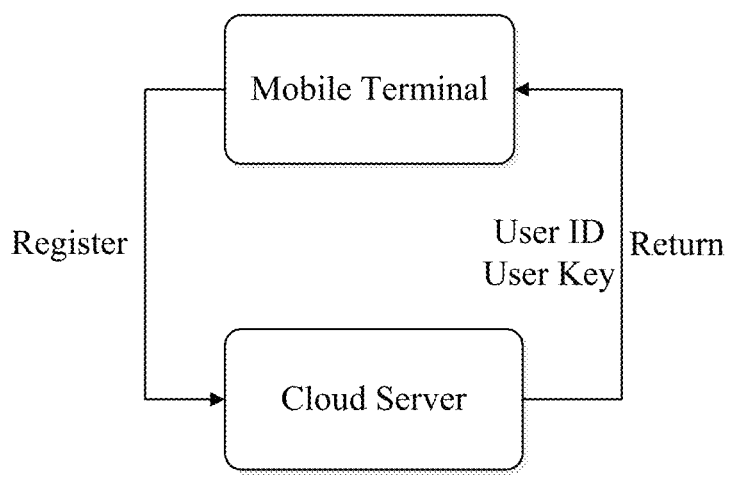
FIG. 3 illustrates a schematic view of an exemplary process of registering to an exemplary cloud server for a user through an exemplary mobile terminal consistent with disclosed embodiments.

Returning to FIG. 1, the mobile terminal 10 and the mobile terminal 20 may interact with the cloud server 40, separately. The user may complete a registration to the cloud server through a mobile terminal. That is, the user can obtain a cloud print account through a mobile terminal. After the registration to the cloud server is completed, an operation may be completed for linking (binding) the cloud print account and one or more cloud printers in the cloud print system. Further, when the user accesses the cloud server through the registered cloud print account on a mobile terminal, the user can access the linked cloud printer, i.e. the bound cloud printer, to use the cloud print service. FIG. 3 illustrates a schematic view of an exemplary process of registering to an exemplary cloud server for a user through an exemplary mobile terminal consistent with various consistent with disclosed embodiments. In some embodiments, a cloud print program (i.e., a cloud print application program), also referred to as a cloud print APP, may need to be installed on the mobile terminal. After the installation, a registration operation can be completed through the cloud print program.

In some embodiments, as shown in FIG. 3, the registration to the cloud server is performed through an Internet protocol, e.g., the HTTPS protocol and via the registration interface of the cloud server, by the cloud print program. After the registration is completed, the cloud server assigns a cloud print account to the user. The cloud print account includes a user name, i.e., a user ID, and a user key. The user can log into the cloud print system by using the assigned user name and user key on the cloud print program of the mobile terminal.

In the exemplary cloud print system shown in FIG. 1, the cloud print program is installed in both the first mobile terminal 10 and the second mobile terminal 20. The user has completed registrations to the cloud server on the first mobile terminal 10 and the second mobile terminal 20, respectively, and has obtained the first and second cloud print accounts. A first cloud print account has been linked (bound) to the cloud printer 30. A second cloud print account has not been linked (bound) to the cloud printer 30.

Specifically, the process of linking (binding) the first cloud print account to the cloud printer 30 may include, for example, the following process.

After the user logs into the cloud server 40 through the first cloud print account on the first mobile terminal 10, the user scans the two-dimensional code on the cloud printer 30 using the cloud print program, or communicates with the NFC module on the cloud printer 30 via the NFC module on the first mobile terminal 10, such that device information of the cloud printer 30 is obtained. The device information of the cloud printer 30 can include, but is not limited to, a name of the cloud printer, an access identification (ID), and the like.

After the device information of the cloud printer 30 is obtained, a request for linking (binding) the cloud printer 30 is sent to the cloud server 40 through the first mobile terminal 10.

The cloud server 40, after receiving the request, communicates with the cloud printer 30 to verify the validity of the request. If the request is valid, the cloud server 40 establishes a linking (binding) relationship between the first cloud print account and the cloud printer 30. Then, the cloud server 40 further pushes cloud-printer-information of the cloud printer 30, e.g., a cloud printer name, an internet protocol (IP) address, a media access control (MAC) address, a geographical position, a current status, etc., to the first mobile terminal 10. The cloud-printer-information of the cloud printer 30 may include, for example, a cloud printer name, an internet protocol (IP) address, a media access control (MAC) address, a geographical position, a current status, and other suitable information of the cloud printer 30.

After the first mobile terminal 10 receives the cloud-printer-information, the first mobile terminal 10 displays, for example, the device information and the status of the cloud printer 30 linked to the current first cloud print account, and further the cloud printer 30 can be clicked and selected on the first mobile terminal 10 to perform print services.

Similarly, the first mobile terminal 10 may also be linked to other cloud printers (not shown) in the cloud print system through the above manner. Similarly, the first cloud print account may also be linked to other cloud printers (not shown) in the cloud print system through the above manner. Although only one cloud printer 30 is shown in FIG. 1 as an example, in the present disclosure, the quantity of the cloud printers is not limited to 1, and can be selected according to various application scenarios.

In order to simplify the operation process and improve the operation security, in the cloud print system of the present disclosure, the user may share the cloud printer 30 that has been linked (bound) to the first cloud print account with the second cloud print account by performing a 1-click operation on the first mobile terminal 10, such that linking, i.e., binding, between the second cloud print account and the cloud printer 30 may be achieved, and the user can use the cloud print service on the second mobile terminal 20. The method is described below.

The first client terminal shares the cloud-printer-information with the second client terminal. The second client terminal receives the cloud-printer-information. The second client terminal, via the second cloud print account, sends to the cloud server a request to link the cloud printer. The cloud server receives, from the second client terminal, the request to link the cloud printer, and links the second cloud print account to the cloud printer.

For description purposes, hereinafter, the first cloud print account that is used on the first mobile terminal 10 and has been linked to the cloud printer 30 is referred to as a "source account", and the second cloud print account that is used on the second mobile terminal 20 and has not been linked to the cloud printer 30 is referred to as a "target account".

Figure 4:
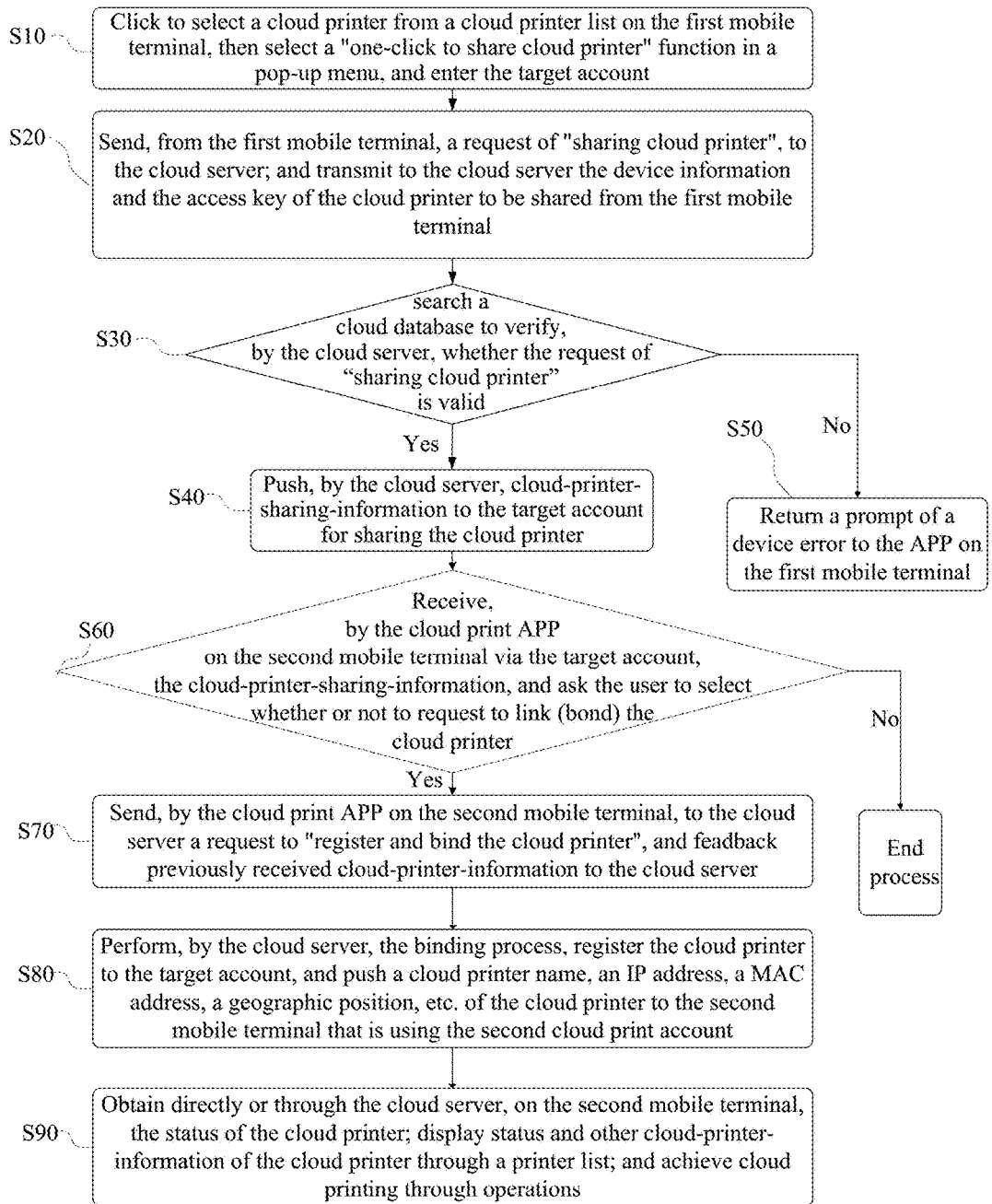
FIG. 4 illustrates a flow chart of an exemplary method of sharing an exemplary cloud printer consistent with disclosed embodiments.

FIG. 4 illustrates a flow chart of an exemplary method of sharing an exemplary cloud printer consistent with disclosed embodiments. With reference to FIG. 4, the exemplary method is described below.

At Step S10, the user uses the first cloud print account, i.e., the source account, on the first mobile terminal 10, clicks to select a cloud printer that has been linked and bound to the source account from a cloud printer list of the cloud print program, then selects a "one-click to share cloud printer" function in a pop-up menu, and enters the target account for sharing the cloud printer 30. In some embodiments, the cloud printer that has been linked to the source account can be, for example, the cloud printer 30 in FIG. 1.

At Step S20, the first mobile terminal 10 sends a request of "sharing cloud printer" to the cloud server 40 via the network; and transmits the device information of the cloud printer 30 to be shared from the first mobile terminal 10, the registration information of the cloud printer 30 on the cloud server 40, and account information of the target account, to the cloud server 40. The device information of the cloud printer 30 can include, but is not limited to, a name of the cloud printer or the like. The registration information of the cloud printer on the cloud server can include, but is not limited to, the access account and the access key of the cloud printer. The account information of the target account can include, for example, a user name of the target account, i.e., a user ID of the target account. Account information of an account can include, for example, a user name of the account, i.e., a user ID of the account. The request of "sharing cloud printer" can include, for example, the device information of the cloud printer 30 to be shared from the first mobile terminal 10, the registration information of the cloud printer 30 on the cloud server 40, and account information of the target account.

At Step S30, the cloud server 40, after receiving the request of "sharing cloud printer" including the device information of the cloud printer 30, the registration information of the cloud printer 30, and account information of the target account, searches a cloud database to verify whether the request is valid.

If the request is valid, Step S40 is executed. If the request is not valid, Step S50 is executed.

At Step S40, the cloud server 40 pushes cloud-printer-sharing-information to the target account for sharing the cloud printer 30. Then, Step S60 is executed. The cloud-printer-sharing-information can at least include, for example, registration information of the source account registered to the cloud server 40 through the first mobile terminal 10 and registration information of access account of the cloud printer 30 registered to the cloud server 40 through the first mobile terminal 10.

At Step S50, the cloud server 40 returns a prompt of a device error to the first mobile terminal 10.

At Step S60, when the user operates the second mobile terminal 20 through the target account or when the user logs into the target account on the second mobile terminal 20 at a later time, the cloud print program on the second mobile terminal 20 receives the cloud-printer-sharing-information pushed from the cloud server 40. Further, after the second mobile terminal 20 receives the cloud-printer-sharing-information, the second mobile terminal 20 further displays to the user cloud-printer-information from the above-described cloud-printer-sharing-information, such that the user can select whether to request to link (bind) the cloud printer 30.

If the use selects to link the cloud printer 30, Step S70 is executed. Otherwise, the process is terminated. In other words, the cloud-printer-sharing-information also includes a prompt of whether the user agrees to link the cloud printer.

At Step S70, after the user using the target account on the second mobile terminal 20 selects to request to link (bind) the cloud printer, the cloud print program on the second mobile terminal 20 sends a request "to link (bind) the cloud printer" to the cloud server 40, and also sends cloud-printer-information of the cloud printer 30 to the cloud server 40.

At Step S80, the cloud server 40 performs a linking (binding) process after receiving the request "to link (bind) the cloud printer", registers the cloud printer 30 to the target account, and pushes cloud-printer-information to the second mobile terminal through the second cloud print account. For example, the cloud-printer-information can include, but is not limited to, a cloud printer name, an IP address, a MAC address, a geographic location, and other suitable information of the cloud printer 30.

At Step S90, the second mobile terminal 20 can directly or indirectly obtain the status of the cloud printer 30 after receiving the IP address, the name and other suitable information of the linked cloud printer 30, and displays certain cloud-printer-information through a printer list in the cloud print program. The displayed cloud-printer-information can include, for example, the device information and the status of the cloud printer. Accordingly, the user using the target account can select the cloud printer 30 on the second mobile terminal 20 and achieve a cloud print task.

In some embodiments, the first mobile terminal 10, before sharing the cloud-printer-information, may have been linked (bound) to the cloud printer to be shared. In present disclosure, the manner of linking (binding) the first mobile terminal 10 and the cloud printer is not restricted, and may be selected according to various application scenarios. Further, the present disclosure also provides a cloud server and a cloud print system including the cloud server, the cloud printer and the at least one client terminal.

Figure 5:
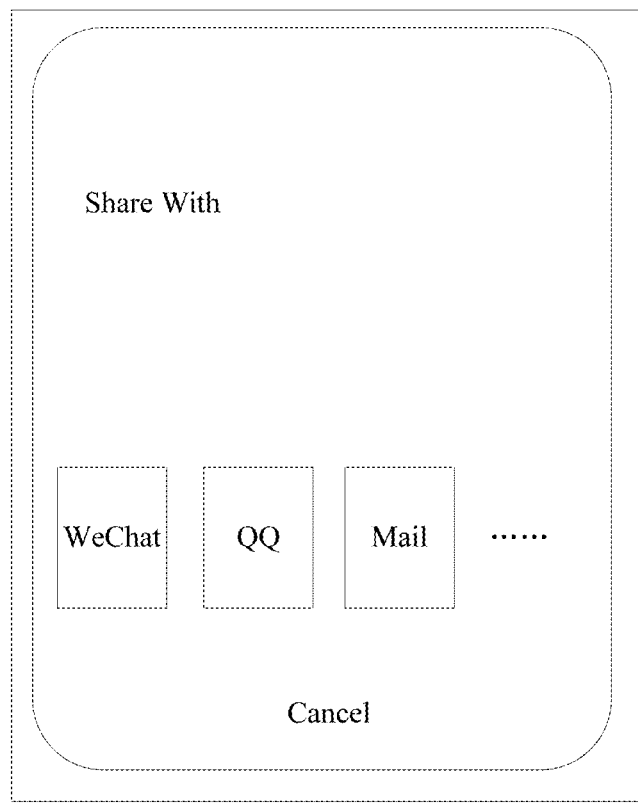
FIG. 5 illustrates that an exemplary mobile terminal shares an exemplary cloud printer with another exemplary mobile terminal consistent with disclosed embodiments.

FIG. 5 illustrates that an exemplary mobile terminal shares an exemplary cloud printer with another exemplary mobile terminal consistent with disclosed embodiments. In addition to that the first client terminal can share the cloud-printer-information with the second client through the above-mentioned cloud server, the first client terminal can also share the cloud-printer-information with the second client terminal through instant messaging software, as shown in FIG. 5. That is, the first client terminal and the second client terminal are separately provided with the instant messaging software, and the first client terminal and the second client terminal can communicate with each other through the instant messaging software. The cloud-printer-information can include, for example, connection information of the cloud printer.

The manner that the first client terminal shares the cloud-printer-information with the second client terminal can include, for example, sharing the connection information of the cloud printer with the second client terminal through the cloud server, or sharing the connection information of the cloud printer with the second client terminal through the instant messaging software, or sharing the connection information of the cloud printer with the second client terminal through a combination of the cloud server and the instant messaging software. The manner that the first client terminal shares the cloud-printer-information with the second client terminal can be, for example, selected by the user, or determined by the first client terminal according to a user preset default sharing manner to execute an operation of sharing the cloud-printer-information.

In some embodiments, the instant messaging software can include, but is not limited to, WeChat, Tencent QQ, Weibo, Microsoft Service Network (MSN) from Microsoft, ICQ from American Online (AOL), Wangwang from Taobao company, Popo from NetEase company, Mi Talk from Xiaomi company, Fetion from China Mobile company, etc.

For example, as shown in FIG. 5, the user can start the program of the cloud printer, i.e., the cloud print program, on the first client terminal and select other different program through the program of the cloud printer to share the cloud-printer-information. The first client terminal can include, for example, a mobile smart device having an embedded operating system to allow the program of the cloud printer to call other application, such as the above-described WeChat, QQ, or other instant messaging software.

Because the instant messaging software may have relatively broad applications on mobile smart devices, it may be easier for other users to connect to the cloud print system by sharing the cloud-printer-information through the instant messaging software.

The present disclosure also provides a method for facilitating a connection to the cloud print system, for other users who have not installed the program of the cloud printer, such as a second user using the second client terminal before the program of the cloud printer (i.e., the cloud print program) is installed on the second client terminal. In the method of the present disclosure, when the first client terminal shares the cloud-printer-information with the second client terminal through the instant messaging software, connection information of the cloud print system, i.e. information for connecting to the cloud print system, and the cloud-printer-information are packaged together and shared with the second client terminal. The connection information of the cloud print system can include, for example, an acquisition address, i.e., a downloading address, of the program of the cloud printer. That is, when the first client terminal shares the cloud-printer-information to the outside via the instant messaging software, the first client terminal packages and then shares together the acquisition address of the program of the cloud printer and the cloud-printer-information.

Figure 6:
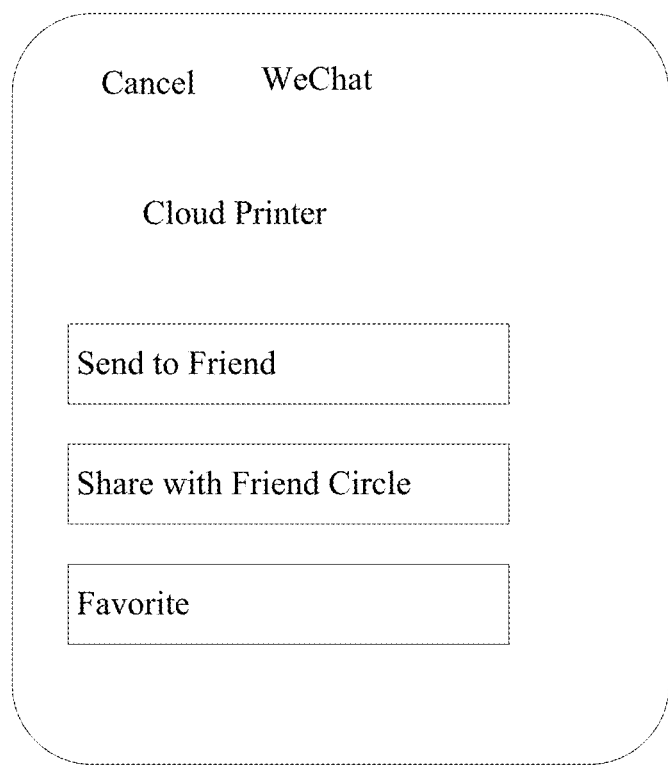
FIG. 6 illustrates a schematic view of sharing an exemplary cloud printer through instant messaging software consistent with disclosed embodiments.

FIG. 6 illustrates a schematic view of sharing an exemplary cloud printer through instant messaging software, e.g., WeChat, consistent with disclosed embodiments. As shown in FIG. 6, using WeChat, the user can choose to share the cloud-printer-information directly to a WeChat friend circle, i.e., a circle for WeChat friends to share information, or directly push the cloud-printer-information to a selected friend. Further, when the first client terminal shares the cloud-printer-information, a certain tag of the program of the cloud printer is packaged and sent together. Accordingly, for client terminals that have been installed with the program of the cloud printer, e.g., a vendor-specific print driver program or a program for connecting to the cloud server, after the cloud-printer-information directly pushed from a friend or shared in the WeChat friend circle is received, the program of the cloud printer can be directly started and executed. Further, by following steps same as or similar to the steps in FIG. 4, the user can log into the previously registered second cloud print account and send the cloud server a request to "link (bind) cloud printer".

In various embodiments, for client terminals that have not been installed with the program of the cloud printer, various methods can be used to achieve "linking (binding) cloud printer" to the client terminals, including examples described below.

For example, for client terminals that have not been installed with the program of the cloud printer, e.g., a vendor-specific print driver program or a program for connecting to the cloud server, after the cloud-printer-information directly pushed from a friend or shared in the WeChat friend circle is received, the packaged information may need to be parsed, then the acquisition address of the program of the cloud printer is obtained after parsing the packaged information, and the user is prompted to select whether to download the program of the cloud printer. If the user selects to download and registers the second cloud print account after downloading the program of the cloud printer, the user can also send the cloud server a request to "link (bind) cloud printer", by following steps same as or similar to the steps in FIG. 4.

In some embodiments, the cloud server may be configured to allow a user to log into the cloud server through an instant messaging software account, e.g., a WeChat account. For example, the cloud server may include an interface to allow the user to log into the cloud server through an instant messaging software account, i.e., an account of instant messaging software. That is, the instant messaging software account may server as a cloud print account. For example, for client terminals that have not been installed with the program of the cloud printer, after the cloud-printer-information directly pushed from a friend (e.g., a WeChat account on the first client terminal) or shared in the WeChat friend circle is received by a WeChat account on the second client terminal, the packaged information corresponding to the cloud-printer-information is parsed, then the acquisition address of the program of the cloud printer is obtained according to the parsed information, and the user of the second client terminal is prompted to select whether to download the program of the cloud printer. If the user of the second client terminal selects to download the program of the cloud printer, after downloading the program of the cloud printer, the user can use the WeChat account on the second client terminal as a second cloud print account through the program of the cloud printer on the second client terminal. Further, the user can send the cloud server a request to "link (bind) cloud printer" by following steps same as or similar to the steps in FIG. 4, and achieve linking (binding) the cloud printer, using the WeChat account on the second client terminal as the second cloud print account.

In some embodiments, for example, client terminals such as a second client terminal may not have been installed with the program of the cloud printer. When an instant messaging software account, e.g., a WeChat account, on the first client terminal shares the cloud-printer-information by directing pushing or sharing in the WeChat friend circle, not only may a certain tag of the program of the cloud printer be packaged and sent together, but also the registration information of the first cloud print account that has been registered to the cloud server and has been linked to the cloud printer may be packaged and sent together. The registration information of the first cloud print account may include, for example, a user name and a user key. After the cloud-printer-information (i.e., the packaged cloud-printer-information) is received by a WeChat account on the second client terminal, the packaged information corresponding to the cloud-printer-information is parsed, then the acquisition address of the program of the cloud printer is obtained according to the parsed information, and the user of the second client terminal is prompted to select whether to download the program of the cloud printer. If the user of the second client terminal selects to download the program of the cloud printer, after downloading the program of the cloud printer, the user can directly use the first cloud print account on the second client terminal, such that the second client terminal can be linked (bound) to the cloud printer through the first cloud print account that has been linked (bound) to the cloud printer. Accordingly, the second client terminal can be linked (bound) to the cloud printer through the same first cloud print account as the first client terminal. That is, the second client terminal can be linked (bound) to the cloud printer through a second cloud print account that is the same cloud print account as the first cloud print account.

In some embodiments, after the second client terminal receives the cloud-printer-information directly pushed from a friend or shared in the WeChat friend circle, the parsed cloud-printer-information can be configured as a certain two-dimensional code, and the user can save the two-dimensional code to the second client terminal. The program of the cloud printer can recognize the cloud-printer-information corresponding to the two-dimensional code. That is, the two-dimensional code can be parsed also, and thus the cloud-printer-information shared by the first client terminal can be obtained. The manner of sharing the cloud-printer-information can include, but is not limited to, the above-described embodiments of using the two-dimensional code.

Figure 7:
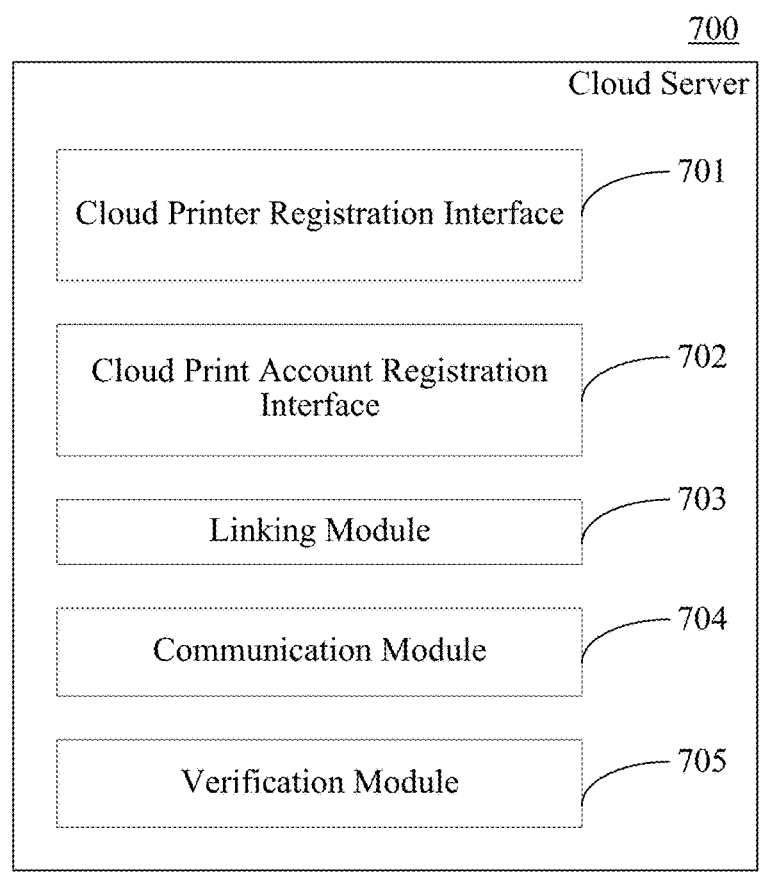
FIG. 7 illustrates a block diagram of an exemplary cloud server consistent with disclosed embodiments.

FIG. 7 illustrates a block diagram of an exemplary cloud server 700 consistent with disclosed embodiments. As shown in FIG. 7, the exemplary cloud server 700 includes a cloud printer registration interface 701, a cloud print account registration interface 702, a linking module 703, a communication module 704, and a verification module 705.

The cloud printer registration interface 701 may be configured to register a cloud printer to the cloud server. The cloud print account registration interface 702 may be configured to register a cloud print account to the cloud server. The linking module 703 may be configured to link a cloud print account registered through the cloud print account registration interface to a cloud printer registered through the cloud printer registration interface. The communication module 704 may be configured to communicate with a client terminal that uses a cloud print account. The verification module 705 may be configured to verify validity of a request.

When the communication module 704 receives a request of sharing a cloud printer linked to a first cloud print account with a second cloud print account, from a first client terminal through a first cloud print account, the verification module 705 may verify the request. If the request is valid, the communication module 704 may push cloud-printer-sharing-information to the second client terminal through a second cloud print account. The linking module 703 may link the second cloud print account to the cloud printer, if the communication module 704 receives a request to link the cloud printer from the second client terminal through the second cloud print account.

In some embodiments, the request of sharing the cloud printer may include, for example, device information of the cloud printer, registration information of the cloud printer on the cloud server, and account information of the second cloud print account. In some embodiments, the registration information of the cloud printer on the cloud server may include, for example, an access account and an access key of the cloud printer. In some embodiments, the cloud-printer-sharing-information may include, for example, registration information of the first cloud print account on the cloud server, and registration information of the cloud printer on the cloud server.

In some embodiments, the exemplary cloud server 700 may serve as the cloud print server 40 in the cloud system shown in FIG. 1.

Figure 8:
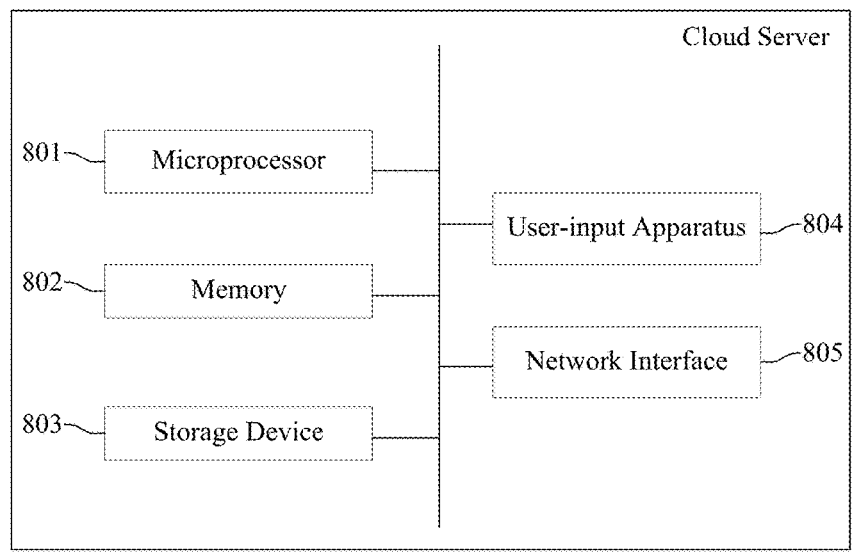
FIG. 8 illustrates a block diagram of an exemplary hardware configuration of an exemplary cloud server consistent with disclosed embodiments.

FIG. 8 illustrates a block diagram of an exemplary hardware configuration of an exemplary cloud server consistent with disclosed embodiments. In the exemplary hardware configuration shown in FIG. 8, the exemplary cloud server includes a microprocessor 801, a memory 802, a storage device 803, a user-input apparatus 804, and a network interface 805.

The memory 802 can include, for example, a read only memory (ROM) and a random access memory (RAM). The storage device 803 can be, for example, a hard disk drive. The user-input apparatus 804 can include, for example, a mouse and a keyboard. The network interface 805 can be, for example, a network interface card. In various embodiments of the present disclosure, the memory 802 may be, for example, configured to store instructions for controlling the microprocessor 801 to perform functions consistent with the present disclosure. The exemplary hardware configuration of the exemplary cloud server shown in FIG. 8 is for illustrative purposes and not intended to limit the disclosure.

Returning to FIG. 1, a direct acquisition of status of the cloud printer 30 may refer to that the second mobile terminal 20 and the cloud printer 30 interacts directly with each other to obtain the status, when a distance between the second mobile terminal 20 and the cloud printer 30 is relatively close. An indirect acquisition of the status of the cloud printer 30 may refer to that the second mobile terminal 20 acquires the status of the cloud printer 30 by interacting with the cloud server 40, or that the second mobile terminal 20 obtains the status of the cloud printer 30 by information exchange with the first mobile terminal 10 via instant messaging software.

In the present disclosure, the configuration of the second cloud print account is not limited in any ways, and may be selectively used according to various application scenarios. In some embodiments, the second cloud print account may be, for example, different from the first cloud print account. In other embodiments, the second cloud print account and the first cloud print account may be a same cloud print account. In certain embodiments, the second cloud print account may be, for example, an instant messaging software account. The instant messaging software account can be, for example, a WeChat account. Linking (binding) the second cloud print account on the second client terminal to the cloud printer may achieve linking (binding) the second client terminal to the cloud printer.

The present disclosure provides a method of sharing a cloud printer in a cloud print system, a cloud server, and a cloud print system. A first cloud print account may be registered to the cloud server of the cloud print system. The first cloud print account may have been linked to the cloud printer. A first client terminal may share cloud-printer-information to a second client terminal. The second client terminal may receive the cloud-printer-information. The second client terminal may receive, through the second cloud print account, cloud-printer-sharing-information pushed from the cloud server. The second client terminal may send, through the second cloud print account, to the cloud server a request to link the cloud printer. The cloud server may link the second cloud print account to the cloud printer after receiving, from the second client terminal, the request to link the cloud printer.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for sharing a cloud printer in a cloud print system, comprising:
sharing cloud-printer-information from a first client terminal with a second client terminal, wherein:
the first client terminal has a first cloud print account registered to a cloud server in the cloud print system,
the first cloud print account is linked to the cloud printer,
receiving the cloud-printer-information on the second client terminal;
sending, from the second client terminal, to the cloud server a request to link the cloud printer, through a second cloud print account, the second cloud print account being one of the first cloud print account and a cloud print account that is different from the first cloud print account; and
linking the second client terminal to the cloud printer by the cloud server, after receiving the request to link the cloud printer from the second client terminal.

2. The method according to claim 1, wherein:
the second cloud print account is different from the first cloud print account, and the second cloud print account is to be linked to the cloud printer;
sharing the cloud-printer-information from the first client terminal with the second client terminal includes:
sending, from the first client terminal, to the cloud server a request for sharing the cloud printer with the second cloud print account, through the first cloud print account,
receiving and verifying, by the cloud server, the request for sharing the cloud printer sent from the first client terminal, and
pushing to the second client terminal cloud-printer-sharing-information by the cloud server and through the second cloud print account, if the request is valid;
receiving the cloud-printer-information on the second client terminal includes:
receiving, on the second client terminal, the cloud-printer-sharing-information pushed by the cloud server, through the second cloud print account; and
linking the second client terminal to the cloud printer by the cloud server, after receiving the request to link the cloud printer from the second client terminal includes:

linking the second cloud print account to the cloud printer by the cloud server, after receiving the request to link the cloud printer from the second client terminal.

3. The method according to claim 2, further comprising:
obtaining, on the second client terminal through the second cloud print account, status of the cloud printer, from the cloud server or by an interaction between the second client terminal and the cloud printer, after the second cloud print account is linked to the cloud printer.

4. The method according to claim 2, wherein:
the request of sharing the cloud printer includes:
device information of the cloud printer;
registration information of the cloud printer on the cloud server; and
account information of the second cloud print account, and
the registration information of the cloud printer on the cloud server includes an access account and an access key of the cloud printer.

5. The method according to claim 2, comprising:
verifying, by the cloud server, whether the request of sharing the cloud printer is valid, via searching a cloud database, and
returning, by the cloud server, a prompt of a device error to the first client terminal, if the request is invalid.

6. The method according to claim 2, wherein the cloud-printer-sharing-information includes:
registration information of the first cloud print account on the cloud server, and
registration information of the cloud printer on the cloud server.

7. The method according to claim 6,
wherein the cloud-printer-sharing-information further includes a prompt of whether or not a user agrees to link the cloud printer,
the method comprising:
sending, from the second client terminal, to the cloud server the request to link the cloud printer, if the second client terminal receives, through the second cloud print account, user operation information of agreeing to link the cloud printer,
wherein the request to link the cloud printer includes registration information of the cloud printer on the cloud server.

8. The method according to claim 2, comprising:
registering the cloud printer to the second cloud print account by the cloud server, such that the second cloud print account is linked to the cloud printer; and
pushing, by the cloud server, the cloud-printer-information to the second client terminal through the second cloud print account,
wherein:
the cloud-printer-information includes a name, an internet protocol address, a media access control address and a geographical position of the cloud printer.

9. The method according to claim 1, wherein:
the first client terminal and the second client terminal are separately provided with instant messaging software, and
sharing the cloud-printer-information from the first client terminal with the second client terminal includes:
sharing the cloud-printer-information from the first client terminal with the second client terminal via the instant messaging software.

10. The method according to claim 9, comprising:
packaging connection information of the cloud print system and the cloud-printer-information together, and sharing the packaged connection information of the cloud print system and cloud-printer-information with the second client terminal, when sharing the cloud-printer-information from the first client terminal with the second client terminal via the instant messaging software.

11. The method according to claim 10,
wherein the second cloud print account has not been registered to the cloud server,
the method further comprising, before sending from the second client terminal to the cloud server a request to link the cloud printer through the second cloud print account:
downloading the program of the cloud printer to the second client terminal; and
registering the second cloud print account that is different from the first cloud print account to the cloud server, through the program of the cloud printer on the second client terminal,
wherein linking the second client terminal to the cloud printer by the cloud server, after receiving the request to link the cloud printer from the second client terminal includes:
linking the second cloud print account to the cloud printer by the cloud server, after receiving the request to link the cloud printer from the second client terminal.

12. The method according to claim 10,
the method further comprising, before sending from the second client terminal to the cloud server a request to link the cloud printer through the second cloud print account:
downloading the program of the cloud printer to the second client terminal; and
using an account of the instant messaging software as the second cloud print account, through the program of the cloud printer on the second client terminal,
wherein linking the second client terminal to the cloud printer by the cloud server, after receiving the request to link the cloud printer from the second client terminal includes:
linking the second cloud print account to the cloud printer by the cloud server, after receiving the request to link the cloud printer from the second client terminal.

13. The method according to claim 9, further comprising:
packaging registration information of the first cloud print account and the cloud-printer-information together, and sharing the registration information of the first cloud print account and the cloud-printer-information with the second client terminal, when sharing the cloud-printer-information from the first client terminal with the second client terminal via the instant messaging software,
wherein:
sending from the second client terminal to the cloud server the request to link the cloud printer through the second cloud print account includes:
sending, from the second client terminal, to the cloud server a request to link the cloud printer, through the first cloud print account serving as the second cloud print account, and linking the second client terminal to the cloud printer by the cloud server, after receiving the request to link the cloud printer from the second client terminal includes:
linking the first cloud print account on the second client terminal to the cloud printer by the cloud server, after receiving the request to link the cloud printer from the second client terminal.

14. A cloud server for a cloud print system, comprising:
a cloud printer registration interface;
a cloud print account registration interface;
a microprocessor configured to link a cloud print account registered through the cloud print account registration interface to a cloud printer registered through the cloud printer registration interface, and to verify validity of a request; and
a communication interface configured to communicate with a client terminal, the client terminal using the cloud print account,
wherein:
when the communication interface receives a request of sharing a cloud printer linked to a first cloud print account, from a first client terminal through a first cloud print account, the microprocessor verifies the request;
if the request is valid, the communication interface pushes cloud-printer-sharing-information to a second client terminal through a second cloud print account, the second cloud print account being one of the first cloud print account and a cloud print account that is different from the first cloud print account; and
the microprocessor links the second cloud print account to the cloud printer, when the communication interface receives a request to link the cloud printer from the second client terminal through the second cloud print account.

15. The cloud server according to claim 14, wherein:
the request of sharing the cloud printer includes device information of the cloud printer, registration information of the cloud printer on the cloud server, and account information of the second cloud print account, and
the registration information of the cloud printer on the cloud server includes an access account and an access key of the cloud printer.

16. The cloud server according to claims 14, wherein the cloud-printer-sharing-information includes:
registration information of the first cloud print account on the cloud server, and
registration information of the cloud printer on the cloud server.

17. A cloud print system, comprising:
a cloud server having a first cloud print account registered thereto;
a cloud printer registered to the cloud server and linked to the first cloud print account;
a first client terminal communicating with the cloud server through the first cloud print account; and
a second client terminal communicating with the cloud server through a second cloud print account, wherein the second cloud print account is one of the first cloud print account and a cloud print account that is different from the first cloud print account,
wherein:
the first client terminal shares cloud-printer-information with the second client terminal, and the second client terminal receives the cloud-printer-information;
the second client terminal, through the second cloud print account, sends to the cloud server a request to link the cloud printer; and
the cloud server receives, the request to link the cloud printer, from the second client terminal, and links the second cloud print account to the cloud printer through a microprocessor of the cloud server.

18. The cloud print system according to claim 17, wherein:
sharing the cloud-printer-information from the first client terminal with the second client terminal includes:
sending, from the first client terminal, to the cloud server a request of sharing the cloud printer;
verifying, by the cloud server through the microprocessor of the cloud server, the request; and
pushing, by the cloud server, to the second client terminal cloud-printer-sharing-information, if the request is valid, and
receiving the cloud-printer-information on the second client terminal includes:
receiving, on the second client terminal, the cloud-printer-sharing-information by the cloud server.

19. The cloud print system according to claim 17, wherein:
the first client terminal and the second client terminal are separately provided with instant messaging software; and
sharing the cloud-printer-information from the first client terminal with the second client terminal includes:
sharing the cloud-printer-information from the first client terminal with the second client terminal via the instant messaging software.

20. The cloud print system according to claim 18, wherein:
the request of sharing the cloud printer includes:
device information of the cloud printer;
registration information of the cloud printer on the cloud server; and
account information of the second cloud print account,
the registration information of the cloud printer on the cloud server includes an access account and an access key of the cloud printer, and
the cloud-printer-sharing-information includes registration information of the first cloud print account on the cloud server and registration information of the cloud printer on the cloud server.

* * * * *